US010598797B2

(12) United States Patent
Zhang (10) Patent No.: US 10,598,797 B2
(45) Date of Patent: Mar. 24, 2020

(54) SWITCHING METHOD AND PORTABLE ELECTRONIC DEVICE (71) Applicant: Huawei Technologies Co., Ltd., Shenzhen (CN)

(72) Inventor: Yajun Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/066,616

(22) PCT Filed: Dec. 29, 2015

(86) PCT No.: PCT/CN2015/099325
§ 371 (c)(1),
(2) Date: Jun. 27, 2018

(87) PCT Pub. No.: WO2017/113078
PCT Pub. Date: Jul. 6, 2017

(65) Prior Publication Data
US 2019/0331802 A1 Oct. 31, 2019

(51) Int. Cl.
*H04W 4/02* (2018.01)
*G01S 19/46* (2010.01)
(Continued)

(52) U.S. Cl.
CPC ............... *G01S 19/46* (2013.01); *G01C 5/06* (2013.01); *H04W 4/02* (2013.01); *H04W 4/40* (2018.02); *H04W 64/006* (2013.01)

(58) Field of Classification Search
CPC .......... G01S 19/34; G01S 19/48; G01S 19/46; G01C 21/005; G01C 21/28; G01C 5/06;
(Continued)

(56) References Cited

U.S. PATENT DOCUMENTS 5,588,038 A 12/1996 Snyder
9,457,754 B1 * 10/2016 Christensen ........ B60R 21/0136
(Continued)

FOREIGN PATENT DOCUMENTS

CN 101369020 A 2/2009
CN 102279404 A 12/2011
(Continued)

OTHER PUBLICATIONS

Foreign Communication From a Counterpart Application, European Application No. 15911709.2, Extended European Search Report dated Sep. 20, 2018, 8 pages.
(Continued)

*Primary Examiner* — Nathan S Taylor
(74) *Attorney, Agent, or Firm* — Conley Rose, P.C.

(57) ABSTRACT

A method includes obtaining barometric data collected by the barometer in preset duration and sound intensity data collected by the sound sensor in the preset duration, where the barometric data includes n groups of collection moments and barometric values, the sound intensity data includes n groups of collection moments and sound intensity values, the barometer and the sound sensor perform collection synchronously, and n is an integer greater than 1, determining that the barometric data and the sound intensity data meet a preset condition, and switching a first positioning algorithm to a second positioning algorithm or switching a first positioning technology to a second positioning technology.

20 Claims, 7 Drawing Sheets (51) Int. Cl.
  *H04W 64/00* (2009.01)
  *G01C 5/06* (2006.01)
  *H04W 4/40* (2018.01)

(58) Field of Classification Search
  CPC ..... H04W 52/0251; H04W 4/40; H04W 4/02; H04W 64/006; Y02D 70/164; Y02D 70/10; H04M 1/72569; H04M 1/72572; H04M 2250/12
  See application file for complete search history.

(56) References Cited

U.S. PATENT DOCUMENTS

| | | | |
|---|---|---|---|
| 2007/0239813 A1* | 10/2007 | Pinder | G01S 19/48 708/270 |
| 2009/0045928 A1 | 2/2009 | Rao et al. | |
| 2010/0009643 A1* | 1/2010 | Haartsen | H04W 52/0251 455/127.5 |
| 2012/0059623 A1 | 3/2012 | Sambongi | |
| 2013/0054180 A1* | 2/2013 | Barfield | G01P 15/0891 702/138 |
| 2014/0064112 A1* | 3/2014 | Das | G01S 5/0252 370/252 |
| 2014/0171068 A1* | 6/2014 | Marti | G01S 1/047 455/427 |
| 2014/0188381 A1* | 7/2014 | Saitoh | G01C 21/005 701/409 |
| 2014/0309864 A1* | 10/2014 | Ricci | H04W 4/21 701/36 |
| 2015/0154711 A1 | 6/2015 | Christopulos et al. | |
| 2016/0029224 A1* | 1/2016 | Edge | G01S 5/0252 455/456.1 |
| 2017/0146970 A1* | 5/2017 | Joo | G05B 19/042 |
| 2017/0276797 A1* | 9/2017 | Hsieh | G01C 21/14 |
| 2018/0364040 A1* | 12/2018 | Seo | G01C 5/06 |
| 2019/0049242 A1* | 2/2019 | Adams | G01S 17/87 |
| 2019/0049566 A1* | 2/2019 | Adams | G01S 7/4972 |

FOREIGN PATENT DOCUMENTS

| | | |
|---|---|---|
| CN | 102435187 A | 5/2012 |
| CN | 102645666 A | 8/2012 |
| CN | 103176194 A | 6/2013 |
| CN | 102090114 B | 9/2013 |
| CN | 103913751 A | 7/2014 |
| CN | 104540220 A | 4/2015 |
| JP | 2010145228 A | 7/2010 |
| JP | 2012052936 A | 3/2012 |
| JP | 2013148385 A | 8/2013 |
| WO | 2014109936 A1 | 7/2014 |
| WO | 2015077489 A1 | 5/2015 |

OTHER PUBLICATIONS

Machine Translation and Abstract of Chinese Publication No. 102279404, Dec. 14, 2011, 18 pages.
Machine Translation and Abstract of Chinese Publication No. 102645666, Aug. 22, 2012, 16 pages.
Machine Translation and Abstract of Chinese Publication No. 103176194, Jun. 26, 2013, 13 pages.
Machine Translation and Abstract of Chinese Publication No. 104540220, Apr. 22, 2015, 13 pages.
Foreign Communication From a Counterpart Application, PCT Application No. PCT/CN2015/099325, English Translation of International Search Report dated Aug. 26, 2016, 2 pages.
Foreign Communication From a Counterpart Application, PCT Application No. PCT/CN2015/099325, English Translation of Written Opinion dated Aug. 26, 2016, 6 pages.
Machine Translation and Abstract of Chinese Publication No. CN102090114, Sep. 25, 2013, 23 pages.
Machine Translation and Abstract of Chinese Publication No. CN103913751, Jul. 9, 2014, 22 pages.
Foreign Communication From a Counterpart Application, Chinese Application No. 201580062125.X, Chinese Office Action dated Apr. 24, 2019, 11 pages.
Machine Translation and Abstract of Japanese Publication No. JP2010145228, Jul. 1, 2010, 28 pages.
Machine Translation and Abstract of Japanese Publication No. JP201052936, Mar. 15, 2012, 27 pages.
Machine Translation and Abstract of Japanese Publication No. JP2013148385, Aug. 1, 2013, 16 pages.
Ioroi, S., et al., "Multiple Floor Dead Reckoning using a Smartphone built-in Sensors," Multimedia, Distributed, Cooperative, and Mobile Symposium (DICOMO2013), Information Processing Society of Japan, Jul. 2013, vol. 2013, No. 2, pp. 723-735.
English Translation of Ioroi, S., et al., "Multiple Floor Dead Reckoning using a Smartphone built-in Sensors," Multimedia, Distributed, Cooperative, and Mobile Symposium (DICOMO2013), Information Processing Society of Japan, Jul. 2013, vol. 2013, No. 2, 27 pages.
Foreign Communication From a Counterpart Application, Japanese Application No. 2018-534144, Japanese Office Action dated Sep. 9, 2019, 3 pages.
Foreign Communication From a Counterpart Application, Japanese Application No. 2018-534144, English Translation of Japanese Office Action dated Sep. 9, 2019, 3 pages.

* cited by examiner

| Time ms | Atmospheric pressure | Time ms | Sound | Time ms | Atmospheric pressure | Time ms | Sound |
|---|---|---|---|---|---|---|---|
| 23465 | 998.27 | 23465 | 35.923 | 64775 | 998.3 | 64775 | 27.246 |
| 23568 | 998.27 | 23568 | 35.923 | 64877 | 998.3 | 64877 | 27.246 |
| 23669 | 998.25 | 23669 | 42.067 | 64980 | 998.32 | 64980 | 27.246 |
| 23772 | 998.26 | 23772 | 42.067 | 65082 | 998.39 | 65082 | 36.663 |
| 23873 | 998.26 | 23873 | 42.067 | 65183 | 998.39 | 65183 | 36.663 |
| 23975 | 998.25 | 23975 | 42.067 | 65285 | 998.35 | 65285 | 36.663 |
| 24078 | 998.25 | 24078 | 38.316 | 65388 | 998.35 | 65388 | 36.663 |
| 24180 | 1000.66 | 24180 | 38.316 | 65489 | 1000.8 | 65489 | 66.696 |
| 24282 | 1000.66 | 24282 | 38.316 | 65591 | 1000.8 | 65591 | 66.696 |
| 24383 | 998.13 | 24383 | 67.325 | 65694 | 998.27 | 65694 | 66.696 |
| 24485 | 998.3 | 24485 | 67.325 | 65795 | 998.29 | 65795 | 56.103 |
| 24588 | 998.3 | 24588 | 67.325 | 65897 | 998.29 | 65897 | 56.103 |
| 24689 | 998.28 | 24689 | 31.978 | 65999 | 998.3 | 65999 | 56.103 |
| 24792 | 998.28 | 24792 | 31.978 | 66101 | 998.3 | 66101 | 56.103 |
| 24893 | 998.26 | 24893 | 31.978 | 66203 | 998.3 | 66203 | 25.136 |
| 24997 | 998.26 | 24997 | 31.978 | 66306 | 998.3 | 66306 | 25.136 |

SWITCHING METHOD AND PORTABLE ELECTRONIC DEVICE

CROSS-REFERENCE TO RELATED APPLICATION

This application is a U.S. National Stage of International Patent Application No. PCT/CN2015/099325 filed Dec. 29, 2015, which is incorporated by reference herein in its entirety.

TECHNICAL FIELD

The present disclosure relates to the communications field, and in particular, to a switching method and a portable electronic device.

BACKGROUND

Global Positioning System (GPS) is usually used in an outdoor environment, and an indoor positioning device based on BLUETOOTH low energy (BLE) or WI-FI is usually deployed in an indoor environment (such as a shopping mall or a garage) to help implement a positioning and navigation function in the indoor environment.

Because strength of a BLUETOOTH signal received by a pedestrian is different from strength of a BLUETOOTH signal received by a vehicle (strength of a BLUETOOTH signal received inside the vehicle is different from strength of a BLUETOOTH signal received outside the vehicle), a positioning technology or a positioning algorithm that is targeted at the pedestrian is not completely applicable to the vehicle.

In other approaches, a motion sensor (such as a gyroscope, an accelerometer, or a magnetometer) is used to identify a pedestrian and a vehicle, and a motion signal of the pedestrian may be captured using the motion sensor to determine whether the pedestrian gets on the vehicle or gets off the vehicle. However, if the vehicle is in an indoor garage, because an electromagnetic environment of the indoor garage is usually complex, a building structure is complex, and there are many reinforced concrete columns, data detected by the motion sensor in the indoor garage is unstable. Consequently, obvious motion feature information of the pedestrian cannot be collected, and whether the pedestrian gets on the vehicle cannot be accurately determined.

SUMMARY

The present disclosure provides a switching method and a portable electronic device to resolve a problem that a pedestrian and a vehicle cannot be accurately identified in order to effectively improve identification accuracy and flexibly switch between positioning of the pedestrian and positioning of the vehicle.

A first aspect provides a switching method, where the method is applied to a portable electronic device including a barometer and a sound sensor, and the method includes obtaining, by the portable electronic device, barometric data collected by the barometer in preset duration and sound intensity data collected by the sound sensor in the preset duration, where the barometric data includes n groups of collection moments and barometric values, the sound intensity data includes n groups of collection moments and sound intensity values, the barometer and the sound sensor perform collection synchronously, and n is an integer greater than 1.

The barometer is mainly configured to collect the barometric data in order to reflect a variation degree of atmospheric pressure. The barometer is usually disposed on a mainboard of the portable electronic device, for example, the barometer is integrated on a chip of a mobile phone mainboard. Certainly, on some portable electronic devices, a barometer function is integrated using some applications, operating systems, or the like. In the present disclosure, an application, an operating system, or the like that is integrated with the barometer function may be considered as the barometer, and this is not limited herein.

The sound sensor is mainly configured to detect sound intensity, and the sound sensor has a function of a microphone (or an audio monitoring unit).

The preset duration is preset and may be adjusted by a user. In actual application, because the user needs a quite short time to get on a vehicle and close a door of the vehicle, the preset duration is usually within 1 second. Alternatively, in order to improve user experience, the preset duration may be user-defined. Further, in the preset duration, the barometer and the sound sensor synchronously collect data, that is, the barometer and the sound sensor simultaneously collect the data at a completely same time point or at an approximately same time point. The approximately same time point causes no great impact on the data collected by the barometer or the data collected by the sound sensor, and the impact may be ignored.

Further, if the portable electronic device determines that the barometric data and the sound intensity data meet a preset condition, the portable electronic device switches a first positioning algorithm to a second positioning algorithm or switches a first positioning technology to a second positioning technology.

The first positioning algorithm and the second positioning algorithm are different positioning algorithms, and the first positioning technology and the second positioning technology are different positioning technologies. The first positioning algorithm and the second positioning algorithm may be determined according to a specific application scenario. The positioning algorithm usually includes a least square method, a triangle centroid method, a weighted triangle centroid algorithm, a weighted centroid algorithm, an improved weighted centroid algorithm, and the like. In actual application, the first positioning algorithm and the second positioning algorithm are each at least one of the foregoing positioning algorithms, and all the foregoing positioning algorithms are some existing indoor or outdoor positioning algorithms. Details are not described herein. In addition, the positioning technology usually includes but is not limited to a positioning technology such as the GPS, an infrared ray, an ultrasonic wave, BLUETOOTH, radio frequency identification, ultra-wideband, a WI-FI positioning technology, or ZIGBEE. The first positioning technology and the second positioning technology are each at least one of the foregoing positioning technologies, and all the foregoing positioning technologies are some existing indoor or outdoor positioning technologies. Details are not described herein. In actual application, for example, if a geographic location of a pedestrian before the pedestrian gets on the vehicle is covered with WI-FI, a WI-FI technology may be used for positioning. After the pedestrian gets on the vehicle, because the vehicle travels at a relatively high speed, not all geographic locations that are possibly related are covered with WI-FI. Therefore, a positioning technology other than WI-FI may be used for positioning, to improve positioning accuracy. In addition, usually, a pedestrian dead reckoning (PDR) positioning technology is used for the pedestrian, and a vehicle dead reckoning (VDR) positioning technology is used for the vehicle. In the PDR positioning technology and the VDR positioning technology, positioning is implemented mainly using a motion sensor such as an accelerator or a gyroscope to detect an object moving speed, distance, and direction. It may be learned that appropriate positioning technologies are used for the pedestrian and the vehicle for high positioning accuracy.

The preset condition includes at least one of the following, where at least one barometric value in the barometric data is greater than a first threshold and at least one sound intensity value in the sound intensity data is greater than a second threshold, the barometric value in the barometric data hops at least once and the sound intensity value in the sound intensity data hops at least once, an average value of all the barometric values in the barometric data is greater than a third threshold and an average value of all the sound intensity values in the sound intensity data is greater than a fourth threshold, an absolute value of a difference between a collection moment of a sound intensity value that is in the sound intensity data and that is greater than a second threshold and a collection moment of a barometric value that is in the barometric data and that is greater than a first threshold is less than a fifth threshold, an absolute value of a difference between a collection moment of a hopped sound intensity value in the sound intensity data and a collection moment of a hopped sound intensity value in the barometric data is less than a sixth threshold, or an absolute value of a difference between a collection moment at which an average value of all the sound intensity values in the sound intensity data is greater than a fourth threshold and a collection moment at which an average value of all the barometric values in the barometric data is greater than a third threshold is less than a seventh threshold.

With reference to the first aspect, in some possible implementations, before obtaining the barometric data collected by the barometer in the preset duration and the sound intensity data collected by the sound sensor in the preset duration, the portable electronic device determines, using some motion sensors or the like installed on the portable electronic device, that the portable electronic device approaches the vehicle, and further triggers to obtain the barometric data collected by the barometer in the preset duration and the sound intensity data collected by the sound sensor in the preset duration.

In actual application, there are multiple manners for determining that the portable electronic device approaches the vehicle. One motion sensor or a combination of multiple motion sensors in a gyroscope, an accelerometer, a magnetometer, or a distance sensor is used to determine that the portable electronic device approaches the vehicle. For example, the distance sensor is used to detect a distance between the portable electronic device and the vehicle. Usually, to indicate that the portable electronic device approaches the vehicle, a relative position distance between the portable electronic device and the vehicle is within a preset range, for example, the preset range is 0 to 1 meter.

In some other possible implementations, after switching the first positioning algorithm to the second positioning algorithm or switching the first positioning technology to the second positioning technology, the portable electronic device stops obtaining the barometric data collected by the barometer in the preset duration and the sound intensity data collected by the sound sensor in the preset duration.

It may be learned that after switching the first positioning algorithm to the second positioning algorithm or switching the first positioning technology to the second positioning technology, the portable electronic device stops obtaining the barometric data collected by the barometer in the preset duration and the sound intensity data collected by the sound sensor in the preset duration such that power consumption is effectively reduced. For example, the portable electronic device is prevented from low battery, a low processing rate, and the like that are caused by uninterrupted data collection performed by the barometer and the sound sensor.

In some other possible implementations, after the first positioning algorithm is switched to the second positioning algorithm, if the portable electronic device determines, using some motion sensors or the like installed on the portable electronic device, that the portable electronic device leaves the vehicle, the portable electronic device switches the second positioning algorithm to the first positioning algorithm.

Alternatively, after the first positioning technology is switched to the second positioning technology, if the portable electronic device determines, using some motion sensors or the like installed on the portable electronic device, that the portable electronic device leaves the vehicle, the portable electronic device switches the second positioning technology to the first positioning technology.

It may be learned that after the portable electronic device leaves the vehicle, the positioning technology or the positioning algorithm used by the portable electronic device is restored to an initial state, that is, the second positioning algorithm is switched to the first positioning algorithm or the second positioning technology is switched to the first positioning technology such that the portable electronic device performs normal positioning according to the original positioning technology or positioning algorithm, and the positioning accuracy is effectively improved. In addition, in actual application, because the portable electronic device is usually put in a pocket, a haversack, or the like of the pedestrian, a state that the pedestrian has gotten off the vehicle is detected to determine that the portable electronic device leaves the vehicle. Certainly, there are multiple manners for determining the state that the pedestrian has gotten off the vehicle. For example, the state that the pedestrian has gotten off the vehicle is determined using one or more manners of using an on-board diagnostics (OBD) module in the vehicle to detect that the vehicle has stalled, using the accelerometer to determine that the vehicle stops, using the sound sensor to detect sound data that is generated when the pedestrian closes the door of the vehicle, using a pedometer to detect a quantity of steps of the pedestrian, or the like. This is not limited herein.

A second aspect provides a portable electronic device, where the portable electronic device is a portable electronic device including a barometer and a sound sensor and includes a unit that is configured to perform the method provided in the first aspect or any possible implementation of the first aspect.

A third aspect provides a portable electronic device, where the portable electronic device is a portable electronic device including a barometer and a sound sensor and includes a detector and a processor, and the detector is connected to the processor, the detector is configured to obtain barometric data collected by the barometer in preset duration and sound intensity data collected by the sound sensor in the preset duration, where the barometric data includes n groups of collection moments and barometric values, the sound intensity data includes n groups of collection moments and sound intensity values, the barometer and the sound sensor perform collection synchronously, and n is an integer greater than 1, the processor is configured to determine that the barometric data and the sound intensity data that are obtained by the detector meet a preset condition, and switch a first positioning algorithm to a second positioning algorithm or switch a first positioning technology to a second positioning technology, and the preset condition includes at least one of the following, where at least one barometric value in the barometric data is greater than a first threshold and at least one sound intensity value in the sound intensity data is greater than a second threshold, the barometric value in the barometric data hops at least once and the sound intensity value in the sound intensity data hops at least once, an average value of all the barometric values in the barometric data is greater than a third threshold and an average value of all the sound intensity values in the sound intensity data is greater than a fourth threshold, an absolute value of a difference between a collection moment of a sound intensity value that is in the sound intensity data and that is greater than a second threshold and a collection moment of a barometric value that is in the barometric data and that is greater than a first threshold is less than a fifth threshold, an absolute value of a difference between a collection moment of a hopped sound intensity value in the sound intensity data and a collection moment of a hopped sound intensity value in the barometric data is less than a sixth threshold, or an absolute value of a difference between a collection moment at which an average value of all the sound intensity values in the sound intensity data is greater than a fourth threshold and a collection moment at which an average value of all the barometric values in the barometric data is greater than a third threshold is less than a seventh threshold.

With reference to the first aspect, in some possible implementations, before the detector obtains the barometric data collected by the barometer in the preset duration and the sound intensity data collected by the sound sensor in the preset duration, the processor is further configured to determine that the portable electronic device approaches a vehicle, and trigger the detector to obtain the barometric data collected by the barometer in the preset duration and the sound intensity data collected by the sound sensor in the preset duration.

With reference to the first aspect, in some possible implementations, after switching the first positioning algorithm to the second positioning algorithm or switching the first positioning technology to the second positioning technology, the processor is further configured to trigger the detector to stop obtaining the barometric data collected by the barometer in the preset duration and the sound intensity data collected by the sound sensor in the preset duration.

With reference to the first aspect, in some possible implementations, after switching the first positioning algorithm to the second positioning algorithm or switching the first positioning technology to the second positioning technology, the processor is further configured to determine that the portable electronic device leaves the vehicle, and switch the second positioning algorithm to the first positioning algorithm, or after switching the first positioning technology to the second positioning technology, the processor is further configured to determine that the portable electronic device leaves the vehicle, and switch the second positioning technology to the first positioning technology.

A fourth aspect provides a portable electronic device, including one or more processors, a memory, a bus system, a transceiver, and one or more programs, where the processor, the memory, and the transceiver are connected using the bus system, and the one or more programs are stored in the memory, the one or more programs include an instruction, and when being executed by the portable electronic device, the instruction enables the portable electronic device to perform the method according to the first aspect or any possible implementation of the first aspect.

A fifth aspect provides a computer readable storage medium that stores one or more programs, where the one or more programs include an instruction, and when being executed by a portable electronic device, the instruction enables the portable electronic device to perform the method according to the first aspect or any possible implementation of the first aspect.

A sixth aspect provides a graphical user interface on a portable electronic device, where the portable electronic device includes a display, a memory, multiple application programs, and one or more processors configured to execute one or more degree stored in the memory, and the graphical user interface includes a user interface displayed using the method according to the first aspect or any possible implementation of the first aspect.

In conclusion, the portable electronic device obtains the barometric data collected by the barometer in the preset duration and the sound intensity data collected by the sound sensor in the preset duration, and switches the positioning algorithm or the positioning technology when determining that the barometric data and the sound intensity data meet the preset condition such that the positioning accuracy is effectively improved. In addition, when the pedestrian and the vehicle are identified according to the data detected by the barometer and the sound sensor, an identification procedure is simple and identification accuracy is high. Further, for the user, an entire process of identifying the pedestrian and the vehicle by the portable electronic device is more intelligent and perception-free such that intelligent experience of the user is met.

In addition, a state that the portable electronic device switches positioning is displayed on the graphical user interface in real time, that is, a positioning status of the pedestrian is updated in real time such that positioning is more intelligent, and user experience is effectively improved.

DESCRIPTION OF EMBODIMENTS

The present disclosure discloses a switching method and a portable electronic device to resolve a problem that a pedestrian and a vehicle cannot be accurately identified in order to effectively improve identification accuracy and flexibly switch between positioning of the pedestrian and positioning of the vehicle.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure without creative efforts shall fall within the protection scope of the present disclosure.

In the specification, claims, and accompanying drawings of the present disclosure, the terms "first," "second," "third," "fourth," and so on are intended to distinguish between different objects but do not indicate a particular order. Moreover, the terms "including," "including," or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
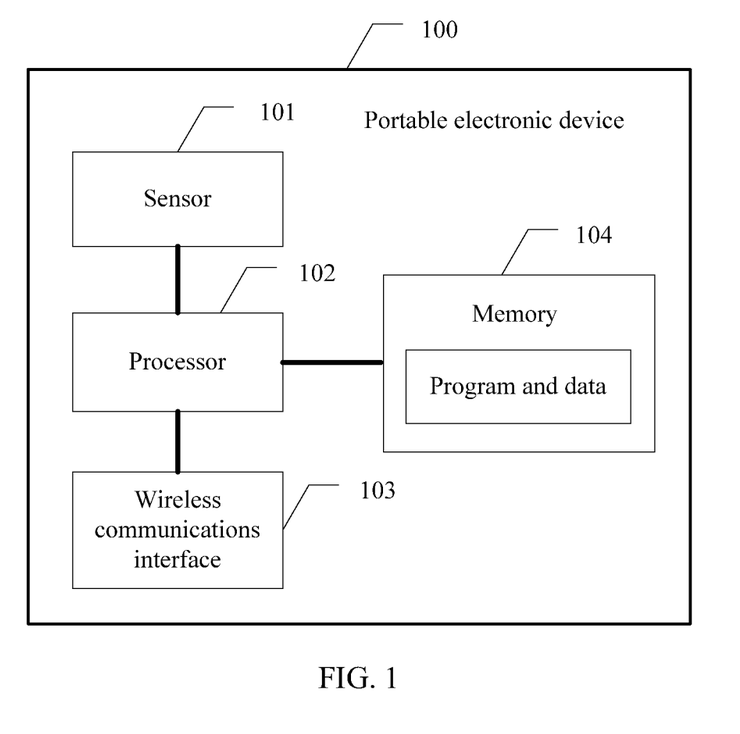
FIG. 1 is a schematic structural diagram of a portable electronic device according to an embodiment of the present disclosure.

The technical solutions in the present disclosure are applied to a portable electronic device. In some embodiments, as shown in FIG. 1, when the portable electronic device 100 is a wearable device (such as a smart watch, smart glasses, a health monitoring band, or a smart wrist strap), the portable electronic device 100 mainly includes a sensor 101, a processor 102, a wireless communications interface 103, and a memory 104. The sensor 101, the processor 102, the wireless communications interface 103, and the memory 104 are connected using one or more buses. The sensor 101 is configured to collect surrounding environment data, and the sensor 101 may be any one or more of a light sensor, a sound sensor, a distance sensor, a gyroscope, a magnetometer, an accelerometer, a barometer, or a manometer. The processor 102 is a control center of the portable electronic device 100, connects to all parts of the entire portable electronic device 100 using various interfaces and lines, and runs or executes a software program and/or a module stored in the memory 104 and invokes program and data stored in the memory 104 to perform various functions of the portable electronic device 100 and/or process data. For example, the processor 102 calculates the environment data collected by the sensor 101 to determine a surrounding environment status. The wireless communications interface 103 is configured to connect to a remote electronic device or a server using WI-FI or BLUETOOTH and exchange data. The memory 104 may be configured to store the software program and the module.

Figure 2:
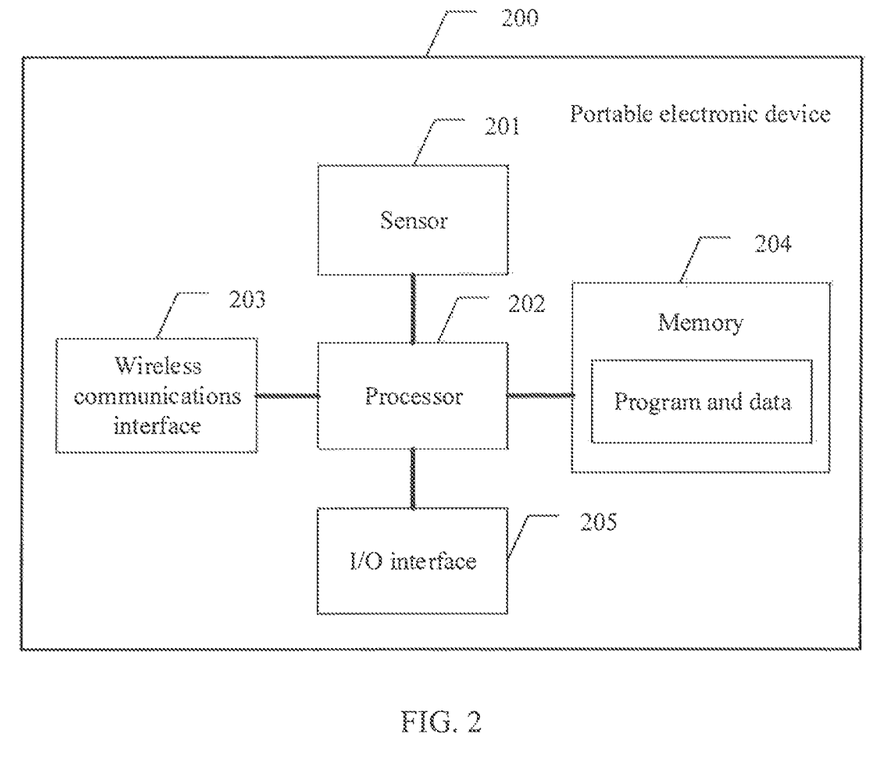
FIG. 2 is another schematic structural diagram of a portable electronic device according to an embodiment of the present disclosure.

In some other embodiments, as shown in FIG. 2, when a portable electronic device 200 is a mobile device (such as a mobile phone, or a tablet computer), the portable electronic device 200 mainly includes a sensor 201, a processor 202, a wireless communications interface 203, a memory 204, and an input/output (I/O) interface 205. The sensor 201, the processor 202, the wireless communications interface 203, the memory 204, and the I/O interface 205 are connected using one or more buses. The sensor 201 is configured to collect surrounding environment data, and the sensor 201 may be any one or more of a light sensor, a sound sensor, a distance sensor, a gyroscope, a magnetometer, an accelerometer, a barometer, or a manometer. The processor 202 is a control center of the portable electronic device 200, connects to all parts of the entire portable electronic device 200 using various interfaces and lines, and runs or executes a software program and/or a module stored in the memory 204 and invokes program and data stored in the memory 204 to perform various functions of the portable electronic device 200 and/or process data. For example, the processor 202 calculates the environment data collected by the sensor 201 to determine a surrounding environment status. The wireless communications interface 203 is configured to connect to a remote electronic device or a server using WI-FI or BLUETOOTH and exchange data. The memory 204 may be configured to store the software program and the module. The I/O interface 205 is configured to implement interaction between a user and the portable electronic device 200 and/or input information to the portable electronic device 200 or convert a format of data output by the processor 202 and output the data.

A person skilled in the art may understand that a structure of the portable electronic device shown in FIG. 1 or FIG. 2 does not constitute a limitation on the present disclosure. The structure may be a bus structure or a star structure, or may include more or fewer components than those shown in the figure, or combine some parts, or have different part arrangements. The portable electronic device in the implementations of the present disclosure includes but is not limited to a mobile phone, a mobile computer, a tablet computer, a personal digital assistant (PDA), a media player, a smart television (TV), a wearable device (such as a smart watch or smart glasses), a combination of the foregoing two or more items, or the like.

Before the embodiments of the present disclosure are described, a scenario to which the present disclosure is applied is described first. In some public scenarios such as a garage, a hospital, a large shopping square, and a park, before a pedestrian gets on a vehicle, the pedestrian is positioned using a handheld (or being put in a haversack or being put in a pocket) portable electronic device. For example, when the pedestrian is in a scenario covered with WI-FI, the portable electronic device positions the pedestrian using a WI-FI technology. However, when the pedestrian gets on the vehicle, the vehicle starts travelling or the vehicle temporarily keeps a static state. When the vehicle is in a travelling state, the pedestrian moves with the vehicle. In a travelling process of the vehicle, a geographic location of the pedestrian may not be covered with WI-FI. In this case, if the portable electronic device still positions a location status of the pedestrian using the WI-FI technology, positioning fails or positioning is inaccurate. In addition, when the pedestrian gets on the vehicle and the vehicle temporarily keeps a static state, the vehicle may be covered with BLUETOOTH, and therefore, if the portable electronic device still positions the pedestrian using the WI-FI technology, accuracy may be not higher than that in implementing positioning using a BLUETOOTH technology. Therefore, it is a key to flexibly switch a positioning technology or a positioning algorithm by identifying a status of whether the pedestrian gets on the vehicle. In the other approaches, some motion sensors are used for detection to determine whether the pedestrian gets on the vehicle. Because the motion sensor is affected by an environment, terrain, or the like, data detected by the motion sensor may be unstable, and whether the user gets on the vehicle cannot be accurately identified. In some alternative solutions, an action of manually closing a door by the pedestrian is used to determine that the user gets on the vehicle. It may be learned that if only the action of closing the door by the user is detected to determine that the user gets on the vehicle, a relatively large error is caused, and user experience is relatively poor. In the present disclosure, a disadvantage in the other approaches is well resolved, and whether the user gets on the vehicle is accurately identified such that the positioning technology or the positioning algorithm is flexibly switched, and positioning accuracy is improved.

Figure 3:
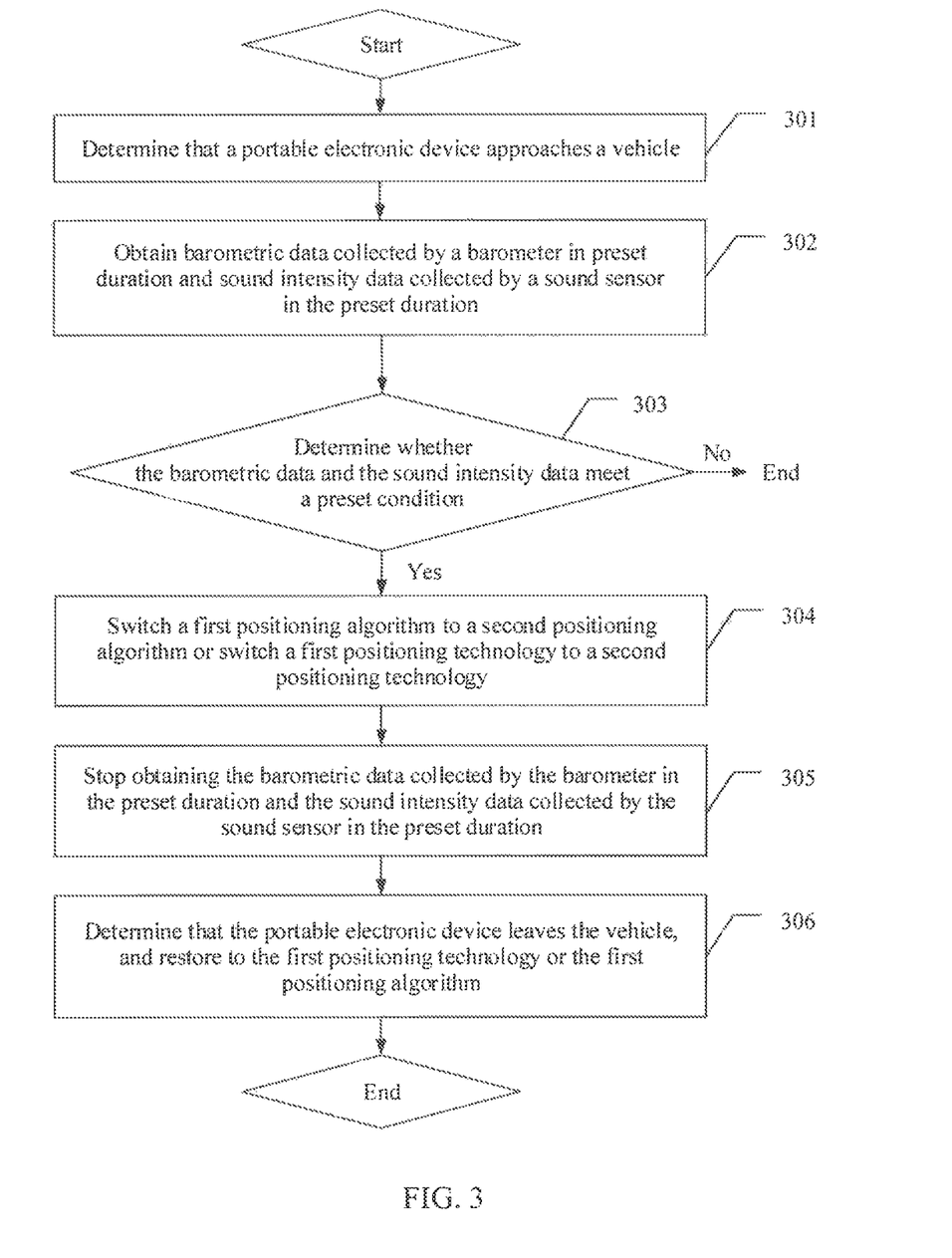
FIG. 3 is a schematic flowchart of a switching method according to an embodiment of the present disclosure.

Referring to FIG. 3, FIG. 3 is a schematic flowchart of a switching method according to an embodiment of the present disclosure. A specific process of this embodiment is as follows.

Step 301: A portable electronic device determines that the portable electronic device approaches a vehicle.

The portable electronic device determines, using some motion sensors integrated on the portable electronic device, whether the portable electronic device approaches the vehicle. For example, the portable electronic device detects a distance between a pedestrian and the vehicle using a distance sensor to determine the distance between the pedestrian and the vehicle, and when the distance is within a preset range, determines that the portable electronic device approaches the vehicle. In actual application, the preset range may be 0 to 1 meter. Certainly, another user-defined preset range or another default preset range of the portable electronic device may be used, and this is not limited herein.

Further, when the portable electronic device approaches the vehicle, the portable electronic device is triggered to obtain barometric data collected by a barometer in preset duration and sound intensity data collected by a sound sensor in the preset duration.

Step 302: The portable electronic device obtains barometric data collected by a barometer in preset duration and sound intensity data collected by a sound sensor in the preset duration.

The switching method is applied to the portable electronic device including the barometer and the sound sensor. The barometer is mainly configured to collect the barometric data in order to reflect a variation degree of atmospheric pressure. The barometer is usually disposed on a mainboard of the portable electronic device, for example, the barometer is integrated on a chip of a mobile phone mainboard. Certainly, on some portable electronic devices, a barometer function is integrated using some applications, operating systems, or the like. In this specification, an application, an operating system, or the like that is integrated with the barometer function may be considered as the barometer, and this is not limited herein. In addition, the sound sensor is mainly configured to detect sound intensity, and the sound sensor has a function of a microphone to some extent.

It should be understood that the preset duration is preset, or may be adjusted by a user. In actual application, because the user needs a quite short time to get on a vehicle and close a door of the vehicle, the preset duration is usually within 1 second. Alternatively, the preset duration may be user-defined.

In actual application, the barometric data includes n groups of collection moments and barometric values, the sound intensity data includes n groups of collection moments and sound intensity values, the barometer and the sound sensor perform collection synchronously, and n is an integer greater than 1. In the preset duration, the barometer and the sound sensor synchronously collect data, that is, the barometer and the sound sensor simultaneously collect the data at a completely same time point or at an approximately same time point. The approximately same time point causes no great impact on the data collected by the barometer or the data collected by the sound sensor, and the impact may be ignored.

Step 303: The portable electronic device determines whether the barometric data and the sound intensity data meet a preset condition, and if yes, performs step 304, or if no, ends the process.

In actual application, the vehicle is small and enclosed space, and air flow inside the vehicle is relatively stable. When the pedestrian gets on the vehicle and closes the door of the vehicle, atmospheric pressure inside the vehicle instantaneously increases, and whether the user gets on the vehicle may be determined according to this characteristic and using the barometer. In addition, a sound is generated when the user closes the door of the vehicle. When it is detected that the atmospheric pressure instantaneously changes, the sound sensor detects an instantaneous change in sound loudness. It may be learned that accuracy is high when whether the user gets on the vehicle is determined according to two conditions of an instantaneous change in the atmospheric pressure and an instantaneous change in the sound intensity.

In this embodiment of the present disclosure, the preset condition includes at least one barometric value in the barometric data is greater than a first threshold and at least one sound intensity value in the sound intensity data is greater than a second threshold.

Figure 4A:
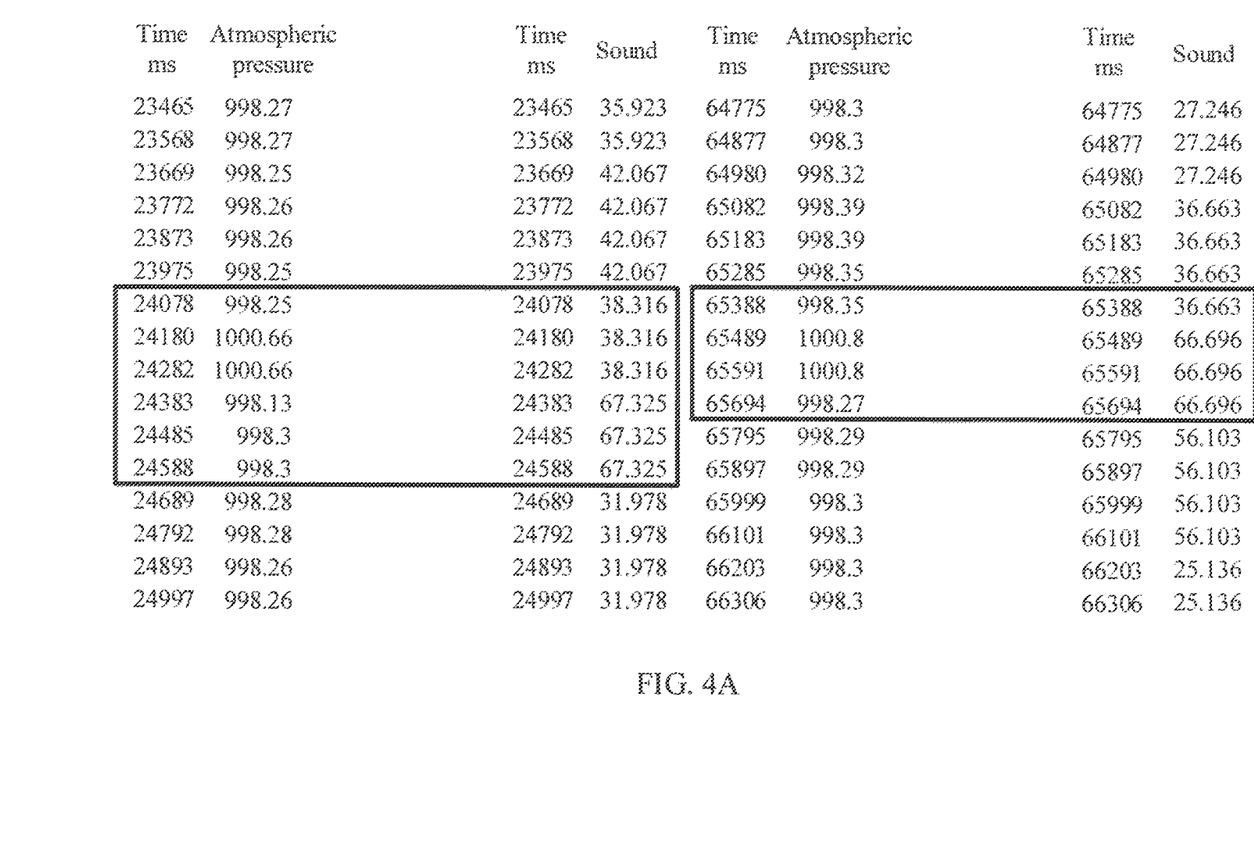
FIG. 4A is a schematic diagram of an embodiment of data collection according to an embodiment of the present disclosure.

In an embodiment, as shown in FIG. 4A, the portable electronic device determines a sampling time window in a default manner or in a user-defined manner. Because that the pedestrian gets on the vehicle and closes the door is a consecutive action, the portable electronic device detects, in a quite short time or even at a same moment, the instantaneous change in the atmospheric pressure inside the vehicle and the change in the sound intensity. A sampling time window of 300 milliseconds (ms) (sampling time window duration may be determined according to an actual test result and is not a fixed value) is determined by analyzing test data. If the portable electronic device detects, in the sampling time window of 300 ms, that the atmospheric pressure and the sound intensity change instantaneously, it is determined whether the barometric data has the at least one barometric value that is greater than the first threshold and whether the sound intensity data has the at least one sound intensity value that is greater than the second threshold. The first threshold and the second threshold are each a default threshold of the portable electronic device or a user-defined threshold. Barometric data and sound intensity data at an adjacent moment are compared, and if the barometric data and the sound intensity data increase and then decrease to normal values in a relatively short time, it may be determined that the pedestrian has gotten on the vehicle.

Alternatively, the preset condition includes that the barometric value in the barometric data hops at least once and the sound intensity value in the sound intensity data hops at least once.

Figure 4B:
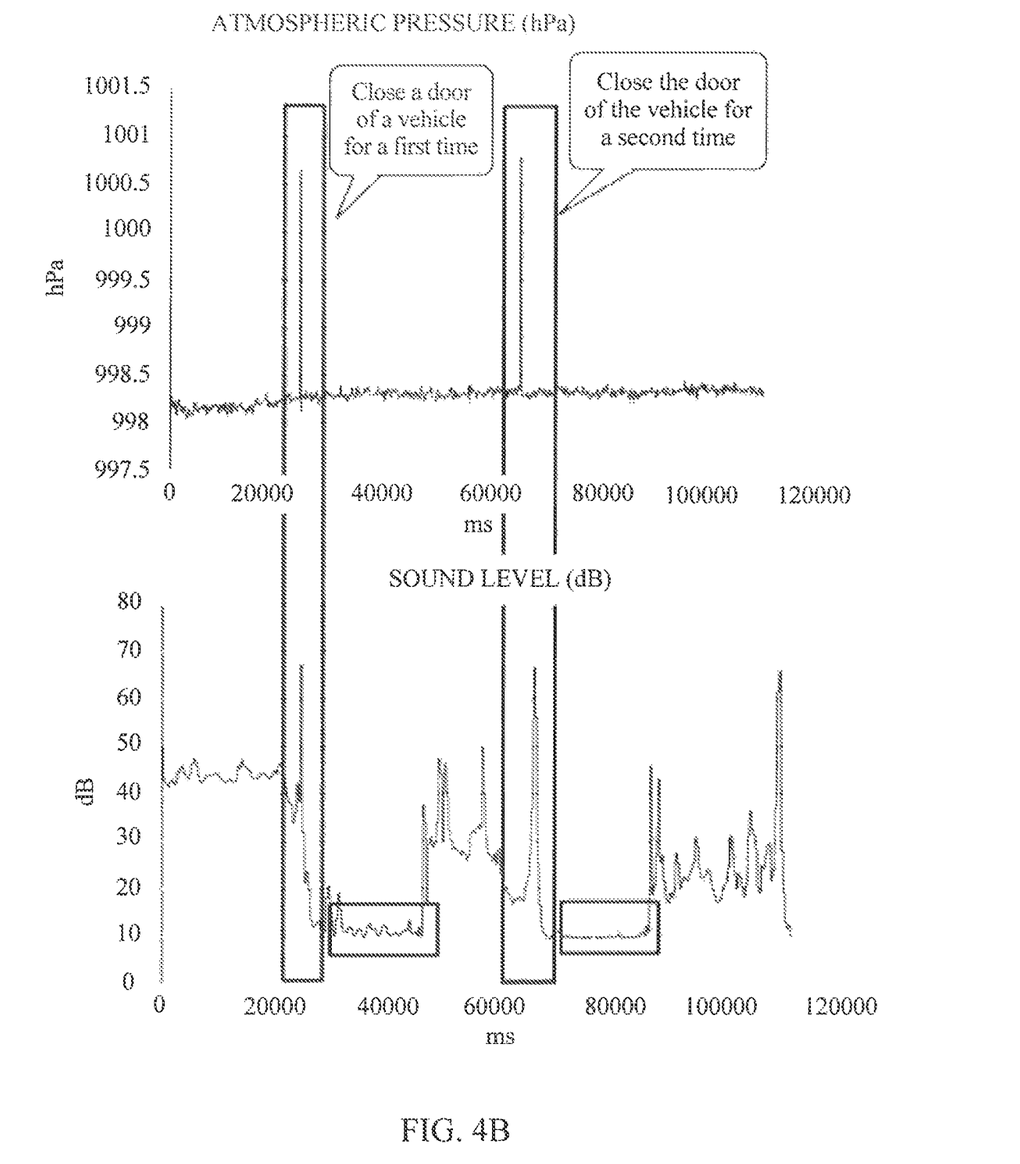
FIG. 4B is a schematic diagram of another embodiment of data collection according to an embodiment of the present disclosure.

In some optional implementations, as shown in FIG. 4B, for the barometric data, a horizontal axis is a time unit ms, and a vertical axis is the barometric value whose unit is hectopascals (hPa). Data of atmospheric pressure measured inside the garage is 998 hPa (around half past three in the afternoon). For the sound intensity data, a horizontal axis is a time unit ms, and a vertical axis is the sound intensity value whose unit is decibels (dB).

When the pedestrian enters the vehicle and closes the door of the vehicle, because the vehicle is enclosed space, atmospheric pressure inside the vehicle instantaneously increases and then decreases to a normal value. Two door closing actions are performed in the entire process, and the barometric data collected by the barometer changes obviously, that is, the barometric data is quite obvious during hopping, and a characteristic of a drawn barometric data curve is also quite obvious. When the pedestrian closes the door of the vehicle, a sound of closing the door of the vehicle collected by the sound sensor also changes obviously, and the sound intensity increases obviously, that is, the sound intensity data is quite obvious during hopping. In 2 seconds (s) to 5 s after the door of the vehicle is closed, because an environment inside the vehicle is relatively quiet, the collected sound intensity data is stable and the sound intensity value is relatively low.

It should be noted that hopping is used to indicate relatively large amplitude of changing, that is, a process in which data is suddenly minimized or the data is suddenly maximized. In this embodiment of the present disclosure, hopping mainly means that the barometric data reaches a maximum peak value in a quite short time, or the sound intensity data reaches a maximum peak value in a quite short time.

Alternatively, the preset condition includes an average value of all the barometric values in the barometric data is greater than a third threshold and an average value of all the sound intensity values in the sound intensity data is greater than a fourth threshold.

In some optional implementations, before hopping, the barometric data and the sound intensity data have been relatively smooth. Therefore, because of hopping, the average value of all the barometric values in the barometric data is greater than the third threshold and the average value of all the sound intensity values in the sound intensity data is greater than the fourth threshold. The third threshold and the fourth threshold are default thresholds of the portable electronic device or user-defined thresholds, and this is not limited herein.

Alternatively, the preset condition includes an absolute value of a difference between a collection moment of a sound intensity value that is in the sound intensity data and that is greater than a second threshold and a collection moment of a barometric value that is in the barometric data and that is greater than a first threshold is less than a fifth threshold.

In some optional implementations, whether the pedestrian gets on the vehicle is determined by determining, by means of comparison, whether the absolute value of the difference between the collection moment of the sound intensity value that is in the sound intensity data and that is greater than the second threshold and the collection moment of the barometric value that is in the barometric data and that is greater than the first threshold is less than the fifth threshold. The fifth threshold may be determined according to a specific test result, for example, the fifth threshold is 300 ms.

Alternatively, the preset condition includes an absolute value of a difference between a collection moment of a hopped sound intensity value that is in the sound intensity data and a collection moment of a hopped sound intensity value in the barometric data is less than a sixth threshold.

In some optional embodiments, whether the pedestrian gets on the vehicle is determined by determining, by means of comparison, whether the absolute value of the difference between the collection moment of the hopped sound intensity value in the sound intensity data and the collection moment of the hopped sound intensity value in the barometric data is less than the sixth threshold. The sixth threshold may be determined according to a specific test result, for example, the sixth threshold is 300 ms.

Alternatively, the preset condition includes an absolute value of a difference between a collection moment at which an average value of all the sound intensity values in the sound intensity data is greater than a fourth threshold and a collection moment at which an average value of all the barometric values in the barometric data is greater than a third threshold is less than a seventh threshold.

In some optional implementations, whether the pedestrian gets on the vehicle is determined by determining, by means of comparison, whether the absolute value of the difference between the collection moment at which the average value of all the sound intensity values in the sound intensity data is greater than the fourth threshold and the collection moment at which the average value of all the barometric values in the barometric data is greater than the third threshold is less than the seventh threshold. The seventh threshold may be determined according to a specific test result, for example, the seventh threshold is 300 ms.

It may be learned that, when the pedestrian and the vehicle are identified according to the data detected by the barometer and the data detected by the sound sensor, an identification procedure is simple and identification accuracy is high. Further, for the user, an entire process of identifying the pedestrian and the vehicle by the portable electronic device is more intelligent and perception-free such that intelligent experience of the user is met.

Step 304: The portable electronic device switches a first positioning algorithm to a second positioning algorithm or switches a first positioning technology to a second positioning technology.

In an embodiment, when the pedestrian gets on the vehicle, the first positioning algorithm is switched to the second positioning algorithm or the first positioning technology is switched to the second positioning technology to effectively improve positioning accuracy.

Step 305: The portable electronic device stops obtaining the barometric data collected by the barometer in the preset duration and the sound intensity data collected by the sound sensor in the preset duration.

It may be learned that after switching the first positioning algorithm to the second positioning algorithm or switching the first positioning technology to the second positioning technology, the portable electronic device stops obtaining the barometric data collected by the barometer in the preset duration and the sound intensity data collected by the sound sensor in the preset duration such that power consumption is effectively reduced. For example, the portable electronic device is prevented from low battery, a low processing rate, and the like that are caused by uninterrupted data collection performed by the barometer and the sound sensor.

Step 306: The portable electronic device determines that the portable electronic device leaves the vehicle, and restores to the first positioning technology or the first positioning algorithm.

It should be noted that step 305 and step 306 may be performed simultaneously or may be performed successively. This may be further determined according to an actual situation and is not limited herein.

In some possible implementations, after the first positioning algorithm is switched to the second positioning algorithm, if the portable electronic device determines, using some motion sensors or the like installed on the portable electronic device, that the portable electronic device leaves the vehicle, the portable electronic device switches the second positioning algorithm to the first positioning algorithm.

Alternatively, in some other possible implementations, after the first positioning technology is switched to the second positioning technology, if the portable electronic device determines, using some motion sensors or the like installed on the portable electronic device, that the portable electronic device leaves the vehicle, the portable electronic device switches the second positioning technology to the first positioning technology.

It may be learned that after the portable electronic device leaves the vehicle, the positioning technology or the positioning algorithm used by the portable electronic device is restored to an initial state, that is, the second positioning algorithm is switched to the first positioning algorithm or the second positioning technology is switched to the first positioning technology such that the portable electronic device performs normal positioning according to the original positioning technology or positioning algorithm, and the positioning accuracy is effectively improved. In addition, in actual application, because the portable electronic device is usually put in a pocket, a haversack, or the like of the pedestrian, a state that the pedestrian has gotten off the vehicle is detected to determine that the portable electronic device leaves the vehicle. Certainly, there are multiple manners for determining the state that the pedestrian has gotten off the vehicle. For example, an OBD module in the vehicle is used to detect that the vehicle has stalled, an accelerometer is used to determine that the vehicle stops, the sound sensor is used to detect sound data that is generated when the pedestrian closes the door of the vehicle, or a pedometer is used to detect a quantity of steps of the pedestrian. This is not limited herein.

It should be noted that step 301 and step 304 to step 306 are all optional implementations. In some embodiments, not all of step 301 and step 304 to step 306 need to be performed, that is, only one or several ones in step 301 and step 304 to step 306 are performed. This is not limited herein.

To facilitate better implementation of the foregoing related method according to the embodiments of the present disclosure, the following further provides a related apparatus configured to perform the foregoing method.

Figure 5:
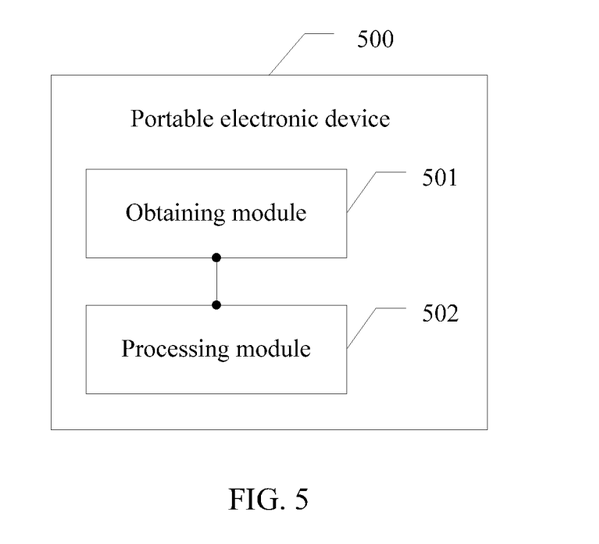
FIG. 5 is another schematic structural diagram of a portable electronic device according to an embodiment of the present disclosure.

Referring to FIG. 5, FIG. 5 is a schematic structural diagram of a portable electronic device 500 according to an embodiment of the present disclosure. The portable electronic device 500 is a portable electronic device including a barometer and a sound sensor, and includes an obtaining module 501 and a processing module 502.

The obtaining module 501 is configured to obtain barometric data collected by the barometer in preset duration and sound intensity data collected by the sound sensor in the preset duration. The barometric data includes n groups of collection moments and barometric values, the sound intensity data includes n groups of collection moments and sound intensity values, the barometer and the sound sensor perform collection synchronously, and n is an integer greater than 1.

The processing module 502 is configured to determine that the barometric data and the sound intensity data that are obtained by the obtaining module 501 meet a preset condition, and switch a first positioning algorithm to a second positioning algorithm or switch a first positioning technology to a second positioning technology.

The preset condition includes at least one of the following, where at least one barometric value in the barometric data is greater than a first threshold and at least one sound intensity value in the sound intensity data is greater than a second threshold, the barometric value in the barometric data hops at least once and the sound intensity value in the sound intensity data hops at least once, an average value of all the barometric values in the barometric data is greater than a third threshold and an average value of all the sound intensity values in the sound intensity data is greater than a fourth threshold, an absolute value of a difference between a collection moment of a sound intensity value that is in the sound intensity data and that is greater than a second threshold and a collection moment of a barometric value that is in the barometric data and that is greater than a first threshold is less than a fifth threshold, an absolute value of a difference between a collection moment of a hopped sound intensity value in the sound intensity data and a collection moment of a hopped sound intensity value in the barometric data is less than a sixth threshold, or an absolute value of a difference between a collection moment at which an average value of all the sound intensity values in the sound intensity data is greater than a fourth threshold and a collection moment at which an average value of all the barometric values in the barometric data is greater than a third threshold is less than a seventh threshold.

It may be learned that the obtaining module obtains the barometric data collected by the barometer in the preset duration and the sound intensity data collected by the sound sensor in the preset duration. When the barometric data and the sound intensity data meet the preset condition, the processing module switches a positioning algorithm or a positioning technology to effectively improve positioning accuracy. In addition, when a pedestrian and a vehicle are identified according to the data detected by the barometer and the data detected by the sound sensor, an identification procedure is simple and identification accuracy is high. Further, for a user, an entire process of identifying the pedestrian and the vehicle by the processing module is more intelligent and perception-free such that intelligent experience of the user is met.

In some possible implementations, before the obtaining module 501 obtains the barometric data collected by the barometer in the preset duration and the sound intensity data collected by the sound sensor in the preset duration, the processing module 502 is further configured to determine that the portable electronic device approaches the vehicle, and trigger the obtaining module 501 to obtain the barometric data collected by the barometer in the preset duration and the sound intensity data collected by the sound sensor in the preset duration.

In an embodiment, there are multiple manners for determining that the portable electronic device approaches the vehicle. A motion sensor such as a gyroscope, an accelerometer, a magnetometer, or a distance sensor is used to determine that the portable electronic device approaches the vehicle. For example, the distance sensor is used to detect a distance between the portable electronic device and the vehicle. Usually, to indicate that the portable electronic device approaches the vehicle, a relative position distance between the portable electronic device and the vehicle is within a preset range, for example, the preset range is 0 to 1 meter.

In some other possible implementations, the processing module 502 is further configured to, after switching the first positioning algorithm to the second positioning algorithm or switching the first positioning technology to the second positioning technology, trigger the obtaining module 501 to stop obtaining the barometric data collected by the barometer in the preset duration and the sound intensity data collected by the sound sensor in the preset duration.

It may be learned that after switching the first positioning algorithm to the second positioning algorithm or switching the first positioning technology to the second positioning technology, the processing module 502 stops obtaining the barometric data collected by the barometer in the preset duration and the sound intensity data collected by the sound sensor in the preset duration such that power consumption is effectively reduced. For example, the portable electronic device is prevented from low battery, a low processing rate, and the like that are caused by uninterrupted data collection performed by the barometer and the sound sensor.

In some other possible implementations, after switching the first positioning algorithm to the second positioning algorithm or switching the first positioning technology to the second positioning technology, the processing module 502 is further configured to determine that the portable electronic device leaves the vehicle, and switch the second positioning algorithm to the first positioning algorithm.

Alternatively, the processing module 502 is further configured to determine that the portable electronic device leaves the vehicle, and switch the second positioning technology to the first positioning technology after switching the first positioning technology to the second positioning technology.

It may be learned that after the portable electronic device 500 leaves the vehicle, the positioning technology or the positioning algorithm used by the portable electronic device 500 is restored to an initial state, that is, the second positioning algorithm is switched to the first positioning algorithm or the second positioning technology is switched to the first positioning technology such that the portable electronic device 500 performs normal positioning according to the original positioning technology or positioning algorithm, and the positioning accuracy is effectively improved. In addition, in actual application, because the portable electronic device 500 is usually put in a pocket, a haversack, or the like of the pedestrian, a state that the pedestrian has gotten off the vehicle is detected to determine that the portable electronic device leaves the vehicle. Certainly, there are multiple manners for determining the state that the pedestrian has gotten off the vehicle. For example, an OBD module in the vehicle is used to detect that the vehicle has stalled, the accelerometer is used to determine that the vehicle stops, the sound sensor is used to detect sound data that is generated when the pedestrian closes a door of the vehicle, or a pedometer is used to detect a quantity of steps of the pedestrian. This is not limited herein.

In a possible implementation, the obtaining module 501 may be a software module and may be performed in a detector of the portable electronic device. The processing module 502 may also be a software module, and can be performed in a processor of a computer system, or may be an application-specific integrated circuit.

Figure 6:
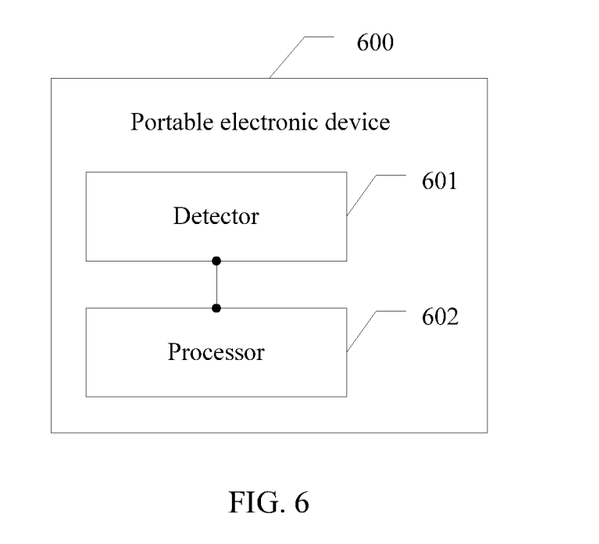
FIG. 6 is another schematic structural diagram of a portable electronic device according to an embodiment of the present disclosure.

In another possible implementation, referring to FIG. 6, FIG. 6 is a schematic structural diagram of a portable electronic device 600 according to an embodiment of the present disclosure. The portable electronic device 600 is a portable electronic device including a barometer and a sound sensor, and includes a detector 601 and a processor 602. The detector 601 is connected to the processor 602. The obtaining module 501 may be replaced with the detector 601, and correspondingly, the processing module 502 may be replaced with the processor 602.

Figure 7:
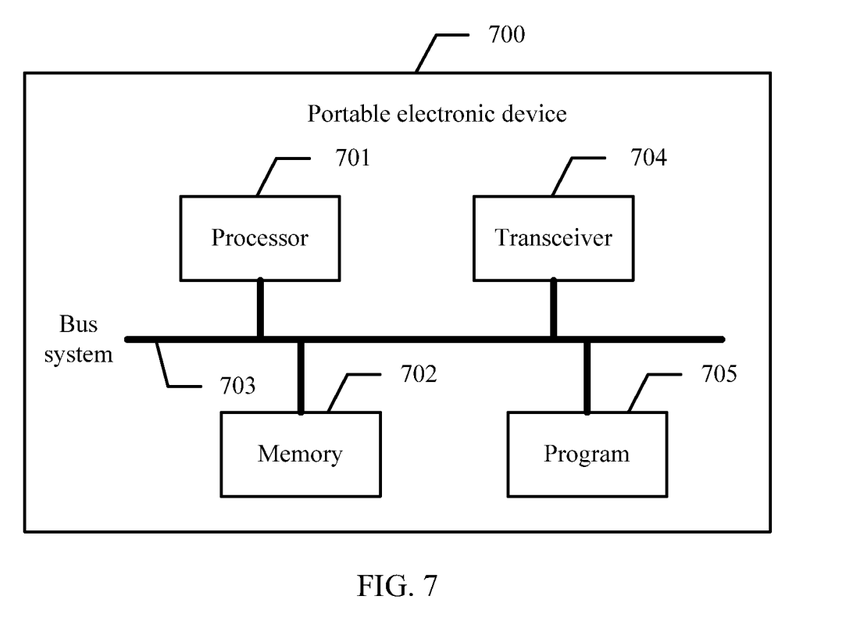
FIG. 7 is another schematic structural diagram of a portable electronic device according to an embodiment of the present disclosure.

Referring to FIG. 7, FIG. 7 is a schematic structural diagram of a portable electronic device 700 according to an embodiment of the present disclosure. The portable electronic device 700 includes one or more processors 701, a memory 702, a bus system 703, a transceiver 704, and one or more programs 705. The processor 701, the memory 702, and the transceiver 704 are connected using the bus system 703.

The one or more programs 705 are stored in the memory 702, the one or more programs 705 include an instruction, and when being executed by the portable electronic device 700, the instruction enables the portable electronic device 700 to perform the method in the embodiment shown in FIG. 3.

In addition, an embodiment of the present disclosure further provides a computer readable storage medium that stores one or more programs. The one or more programs include an instruction, and when being executed by a portable electronic device, the instruction enables the portable electronic device to perform the method in the embodiment shown in FIG. 3.

It may be learned that a function of the portable electronic device in the present disclosure may be implemented according to the method in the embodiment shown in FIG. 3. For a specific implementation process, refer to related descriptions in the method embodiment shown in FIG. 3. Details are not described herein again. The portable electronic device is used to perform the method in the embodiment shown in FIG. 3, to achieve a technical effect that can be achieved in the method embodiment.

Figure 8:
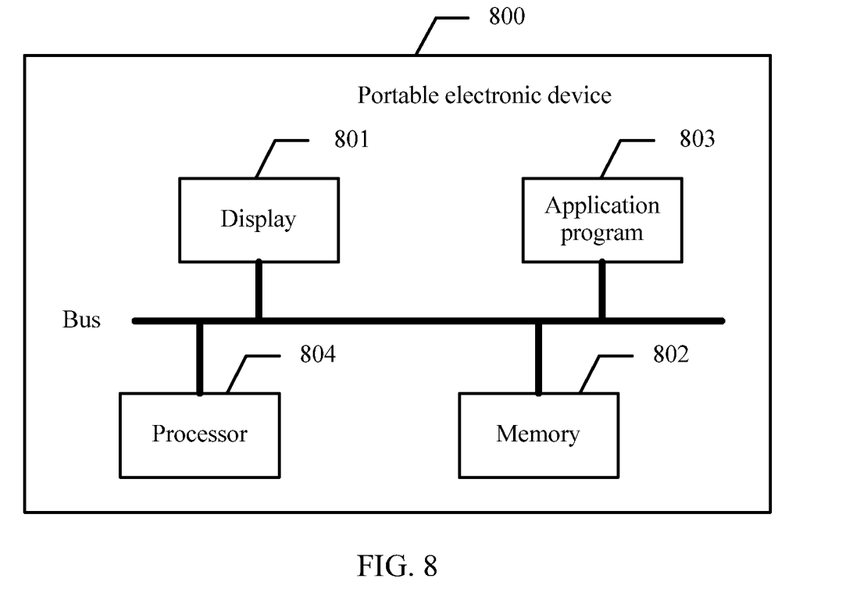
FIG. 8 is another schematic structural diagram of a portable electronic device according to an embodiment of the present disclosure.

Referring to FIG. 8, an embodiment of the present disclosure provides a graphical user interface on a portable electronic device 800. The portable electronic device 800 includes a display 801, a memory 802, multiple application programs 803, and one or more processors 804 configured to execute one or more programs stored in the memory 802, and the graphical user interface includes a user interface displayed using the method in the embodiment shown in FIG. 3.

It may be learned that a state that the portable electronic device 800 switches positioning is displayed on the graphical user interface in real time, that is, a positioning status of a pedestrian is updated in real time such that positioning is more intelligent, and user experience is effectively improved.

In the foregoing embodiments, descriptions of the embodiments have respective focuses. For a part that is not described in detail in an embodiment, refer to related descriptions in other embodiments.

It may be clearly understood by a person skilled in the art that, for the purpose of convenient and brief description, for a detailed working process of the foregoing portable electronic device, computer readable storage medium, and unit, refer to a corresponding process in the foregoing method embodiment. Details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions provided in the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present disclosure essentially, or the part contributing to the other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

A portable electronic device, a computer readable storage medium, a graphical user interface, and a method provided in the present disclosure are described in detail above. Specific examples are used in this specification to describe the principle and implementations of the present disclosure. The foregoing embodiments are merely intended to help understand the method and idea of the present disclosure. In addition, with respect to the implementations and the application scope, modifications may be made by a person of ordinary skill in the art according to the idea of the present disclosure. Therefore, the specification shall not be construed as a limitation on the present disclosure.

What is claimed is:

1. A switching method, applied to a portable electronic device comprising a barometer and a sound sensor, comprising:
    obtaining barometric data collected by the barometer in a preset duration and sound intensity data collected by the sound sensor in the preset duration, wherein the barometric data comprises barometric values collected in a series of moments in the preset duration, wherein the sound intensity data comprises sound intensity data collected in the series of moments in the preset duration, and wherein the barometer and the sound sensor perform collection synchronously;
    determining that the barometric data and the sound intensity data meet a preset condition, wherein the preset condition corresponds to the portable electronic device entering a vehicle; and
    switching a first positioning algorithm to a second positioning algorithm or switching a first positioning technology to a second positioning technology based on a determination that the portable electronic device enters the vehicle, wherein the preset condition comprises at least one of:
        at least one barometric value in the barometric data is greater than a first threshold and at least one sound intensity value in the sound intensity data is greater than a second threshold;
        the at least one barometric value in the barometric data increases at least once and the at least one sound intensity value in the sound intensity data increases at least once;
        an average value of all the barometric values in the barometric data is greater than a third threshold and an average value of all the sound intensity values in the sound intensity data is greater than a fourth threshold;
        an absolute value of a difference between a first time when a sound intensity value in the sound intensity data is greater than the second threshold and a second time when a barometric value in the barometric data is greater than the first threshold is less than a fifth threshold;
        an absolute value of a difference between a third time when a sound intensity value in the sound intensity data increases and a fourth time when a barometric value in the barometric data increases is less than a sixth threshold; or
        an absolute value of a difference between a fifth time when the average value of all the sound intensity values in the sound intensity data is greater than the fourth threshold and a sixth time when the average value of all the barometric values in the barometric data is greater than the third threshold is less than a seventh threshold.

2. The switching method of claim 1, wherein before obtaining the barometric data and the sound intensity data, the switching method further comprises:
    determining that the portable electronic device approaches the vehicle; and
    triggering to obtain the barometric data collected by the barometer in the preset duration and the sound intensity data collected by the sound sensor in the preset duration.

3. The switching method of claim 2, wherein after switching the first positioning algorithm to the second positioning algorithm, the switching method further comprises:
    determining that the portable electronic device leaves the vehicle; and
    switching the second positioning algorithm to the first positioning algorithm.

4. The switching method of claim 2, wherein after switching the first positioning technology to the second positioning technology, the switching method further comprises:
    determining that the portable electronic device leaves the vehicle; and
    switching the second positioning technology to the first positioning technology.

5. The switching method of claim 2, wherein after switching the first positioning algorithm to the second positioning algorithm or switching the first positioning technology to the second positioning technology, the switching method further comprises stop obtaining the barometric data collected by the barometer in the preset duration and the sound intensity data collected by the sound sensor in the preset duration.

6. The switching method of claim 1, wherein after switching the first positioning algorithm to the second positioning algorithm or switching the first positioning technology to the second positioning technology, the switching method further comprises stop obtaining the barometric data collected by the barometer in the preset duration and the sound intensity data collected by the sound sensor in the preset duration.

7. An electronic device, comprising:
a non-transitory computer-readable storage medium storing programming instructions;
a barometer coupled to the non-transitory computer-readable storage medium and configured to collect barometric data in a preset duration;
a sound sensor coupled to the non-transitory computer-readable storage medium and configured to collect sound intensity data in the preset duration; and
at least one processor coupled to the non-transitory computer-readable storage medium, the barometer, and the sound sensor, wherein the programming instructions cause the at least one processor to be configured to:
obtain the barometric data and the sound intensity data, wherein the barometric data comprises barometric values collected in a series of moments in the preset duration, wherein the sound intensity data comprises sound intensity data collected in the series of moments in the preset duration, and wherein the barometer and the sound sensor perform collection synchronously;
determine that the barometric data and the sound intensity data meet a preset condition, wherein the preset condition corresponds to the electronic device entering a vehicle; and
switch a first positioning algorithm to a second positioning algorithm or switch a first positioning technology to a second positioning technology based on a determination that the electronic device enters the vehicle, wherein the preset condition comprises at least one of:
at least one barometric value in the barometric data is greater than a first threshold and at least one sound intensity value in the sound intensity data is greater than a second threshold;
the at least one barometric value in the barometric data increases at least once and the at least one sound intensity value in the sound intensity data increases at least once;
an average value of all the barometric values in the barometric data is greater than a third threshold and an average value of all the sound intensity values in the sound intensity data is greater than a fourth threshold;
an absolute value of a difference between a first time when a sound intensity value in the sound intensity data is greater than the second threshold and a second time when a barometric value in the barometric data is greater than the first threshold is less than a fifth threshold;
an absolute value of a difference between a third time when a sound intensity value in the sound intensity data increases and a fourth time when a barometric value in the barometric data increases is less than a sixth threshold; or
an absolute value of a fifth time when the average value of all the sound intensity values in the sound intensity data is greater than the fourth threshold and a sixth time when the average value of all the barometric values in the barometric data is greater than the third threshold is less than a seventh threshold.

8. The electronic device of claim 7, wherein before obtaining the barometric data and the sound intensity data, the programming instructions further cause the at least one processor to be configured to:
determine that the electronic device approaches the vehicle; and
trigger to obtain the barometric data collected by the barometer in the preset duration and the sound intensity data collected by the sound sensor in the preset duration.

9. The electronic device of claim 8, wherein after switching the first positioning algorithm to the second positioning algorithm, the programming instructions further cause the at least one processor to be configured to:
determine that the electronic device leaves the vehicle; and
switch the second positioning algorithm to the first positioning algorithm.

10. The electronic device of claim 8, wherein after switching the first positioning technology to the second positioning technology, the programming instructions further cause the at least one processor to be configured to:
determine that the electronic device leaves the vehicle; and
switch the second positioning technology to the first positioning technology.

11. The electronic device of claim 8, wherein after switching the first positioning algorithm to the second positioning algorithm or switching the first positioning technology to the second positioning technology, the programming instructions further cause the at least one processor to be configured to stop obtaining the barometric data and the sound intensity data.

12. The electronic device of claim 7, wherein after switching the first positioning algorithm to the second positioning algorithm or switching the first positioning technology to the second positioning technology, the programming instructions further cause the at least one processor to be configured to stop obtaining the barometric data and the sound intensity data.

13. A non-transitory computer readable storage medium storing one or more programs comprising programming instructions, and when executed by an electronic device comprising a barometer and a sound sensor, the programming instructions cause the electronic device to be configured to:
obtain barometric data collected by the barometer in a preset duration and sound intensity data collected by the sound sensor in the preset duration, wherein the barometric data comprises barometric values collected in a series of moments in the preset duration, wherein the sound intensity data comprises sound intensity data collected in the series of moments in the preset duration, and wherein the barometer and the sound sensor perform collection synchronously;
determine that the barometric data and the sound intensity data meet a preset condition, wherein the preset condition corresponds to the electronic device entering a vehicle; and
switch a first positioning algorithm to a second positioning algorithm or switch a first positioning technology to a second positioning technology based on a determination that the electronic device enters the vehicle, wherein the preset condition comprises at least one of:

at least one barometric value in the barometric data is greater than a first threshold and at least one sound intensity value in the sound intensity data is greater than a second threshold;

the at least one barometric value in the barometric data increases at least once and the at least one sound intensity value in the sound intensity data increases at least once;

an average value of all the barometric values in the barometric data is greater than a third threshold and an average value of all the sound intensity values in the sound intensity data is greater than a fourth threshold;

an absolute value of a difference between a first time when a sound intensity value in the sound intensity data is greater than the second threshold and a second time when a barometric value in the barometric data is greater than the first threshold is less than a fifth threshold;

an absolute value of a difference between a third time when a sound intensity value in the sound intensity data increases and a fourth time when a barometric value in the barometric data increases is less than a sixth threshold; or an absolute value of a fifth time when the average value of all the sound intensity values in the sound intensity data is greater than the fourth threshold and a sixth time when the average value of all the barometric values in the barometric data is greater than the third threshold is less than a seventh threshold.

14. The non-transitory computer readable storage medium of claim 13, wherein before obtaining the barometric data and the sound intensity data, the programming instructions further cause the electronic device to be configured to:

determine that the electronic device approaches the vehicle; and trigger to obtain the barometric data collected by the barometer in the preset duration and the sound intensity data collected by the sound sensor in the preset duration.

15. The non-transitory computer readable storage medium of claim 14, wherein after switching the first positioning algorithm to the second positioning algorithm, the programming instructions further cause the electronic device to be configured to:

determine that the electronic device leaves the vehicle; and switch the second positioning algorithm to the first positioning algorithm.

16. The non-transitory computer readable storage medium of claim 14, wherein after switching the first positioning technology to the second positioning technology, the programming instructions further cause the electronic device to be configured to:

determine that the electronic device leaves the vehicle; and switch the second positioning technology to the first positioning technology.

17. The non-transitory computer readable storage medium of claim 14, wherein after switching the first positioning algorithm to the second positioning algorithm, the programming instructions further cause the electronic device to be configured to stop obtaining the barometric data collected by the barometer in the preset duration and the sound intensity data collected by the sound sensor in the preset duration.

18. The non-transitory computer readable storage medium of claim 14, wherein after switching the first positioning technology to the second positioning technology, the programming instructions further cause the electronic device to be configured to stop obtaining the barometric data collected by the barometer in the preset duration and the sound intensity data collected by the sound sensor in the preset duration.

19. The non-transitory computer readable storage medium of claim 13, wherein after switching the first positioning algorithm to the second positioning algorithm, the programming instructions further cause the electronic device to be configured to stop obtaining the barometric data collected by the barometer in the preset duration and the sound intensity data collected by the sound sensor in the preset duration.

20. The non-transitory computer readable storage medium of claim 13, wherein after switching the first positioning technology to the second positioning technology, the programming instructions further cause the electronic device to be configured to stop obtaining the barometric data collected by the barometer in the preset duration and the sound intensity data collected by the sound sensor in the preset duration.

* * * * *